W. C. WINFIELD & A. C. TAYLOR.
BENDING AND WELDING MACHINE.
APPLICATION FILED JULY 29, 1911.

1,071,490.

Patented Aug. 26, 1913.

4 SHEETS—SHEET 1.

ATTEST
E. M. Fisher
J. C. Mussun

INVENTORS
WILLIAM C. WINFIELD
ALBERTIS C. TAYLOR
BY Fisher & Moser, ATTYS

W. C. WINFIELD & A. C. TAYLOR.
BENDING AND WELDING MACHINE.
APPLICATION FILED JULY 29, 1911.

1,071,490.

Patented Aug. 26, 1913.
4 SHEETS—SHEET 3.

ATTEST
E. M. Fisher
J. C. Mussun.

INVENTORS
WILLIAM C. WINFIELD
ALBERTIS C. TAYLOR
By Fisher & Woods ATTYS.

W. C. WINFIELD & A. C. TAYLOR.
BENDING AND WELDING MACHINE.
APPLICATION FILED JULY 29, 1911.

1,071,490.

Patented Aug. 26, 1913.

4 SHEETS—SHEET 4.

ATTEST

INVENTORS
WILLIAM C. WINFIELD
ALBERTIS C. TAYLOR
BY ATTYS.

UNITED STATES PATENT OFFICE.

WILLIAM C. WINFIELD AND ALBERTIS C. TAYLOR, OF WARREN, OHIO, ASSIGNORS TO THE WINFIELD MANUFACTURING COMPANY, OF WARREN, OHIO, A CORPORATION.

BENDING AND WELDING MACHINE.

1,071,490.  Specification of Letters Patent.  Patented Aug. 26, 1913.

Application filed July 29, 1911. Serial No. 641,300.

*To all whom it may concern:*

Be it known that we, WILLIAM C. WIN-FIELD and ALBERTIS C. TAYLOR, citizens of the United States, residing at Warren, in the county of Trumbull and State of Ohio, have invented certain new and useful Improvements in Bending and Welding Machines, of which the following is a specification.

This invention relates to a bending and welding machine, and the invention consists in a machine particularly constructed to bend and electrically weld metal bars, substantially as herein shown and described and more particularly pointed out in the claims.

Briefly, the object of the invention is to provide a machine adapted to hold a notched bar between clamps rotatably related to one another whereby the bar may be bent to any given angle and whereby pressure and an electric current may be applied in bending operations to weld the bar where notched.

The machine saves labor and operates rapidly and economically and the welded product is free from scale and is bent uniform and true to any predetermined angle within the range of the machine as constructed.

Figure 1:
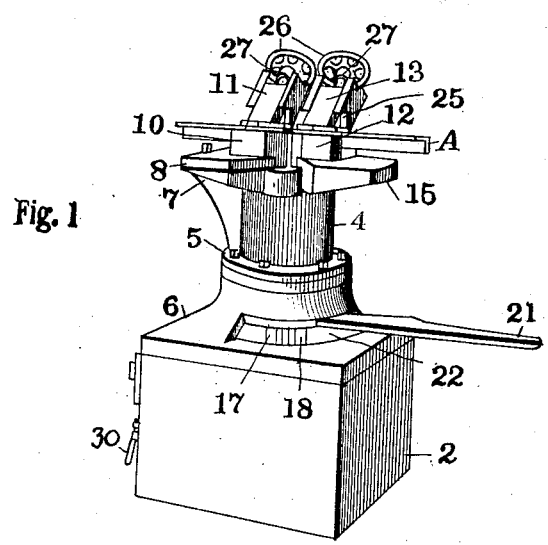
Figure 2:
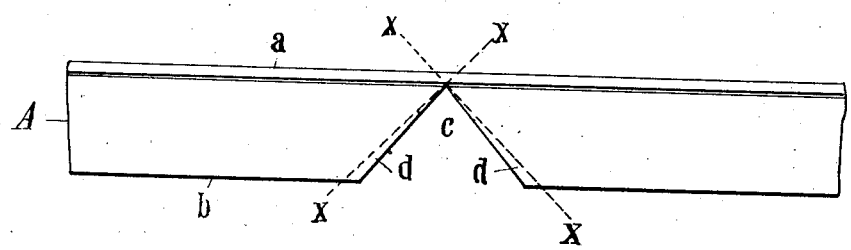
Figure 3:
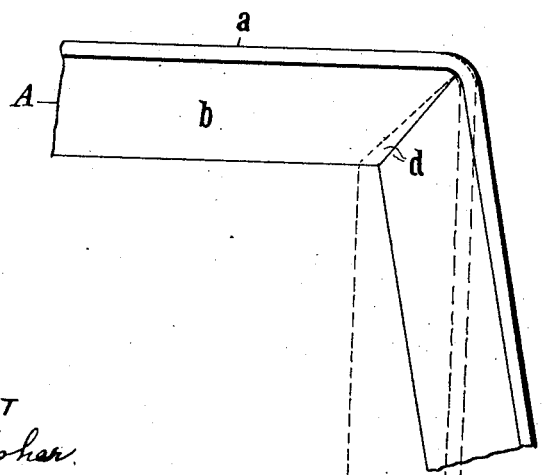
Figure 4:
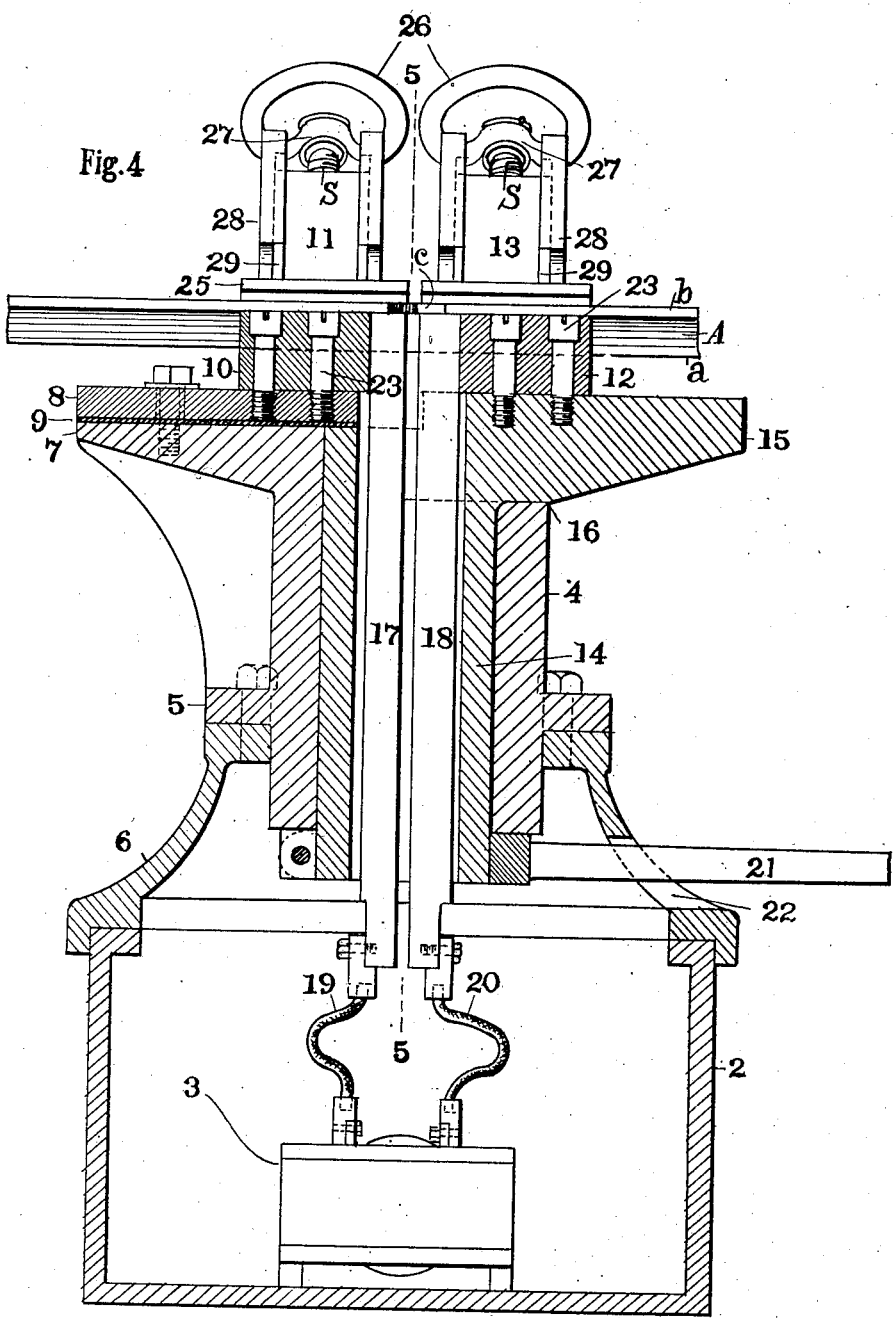
Figure 5:
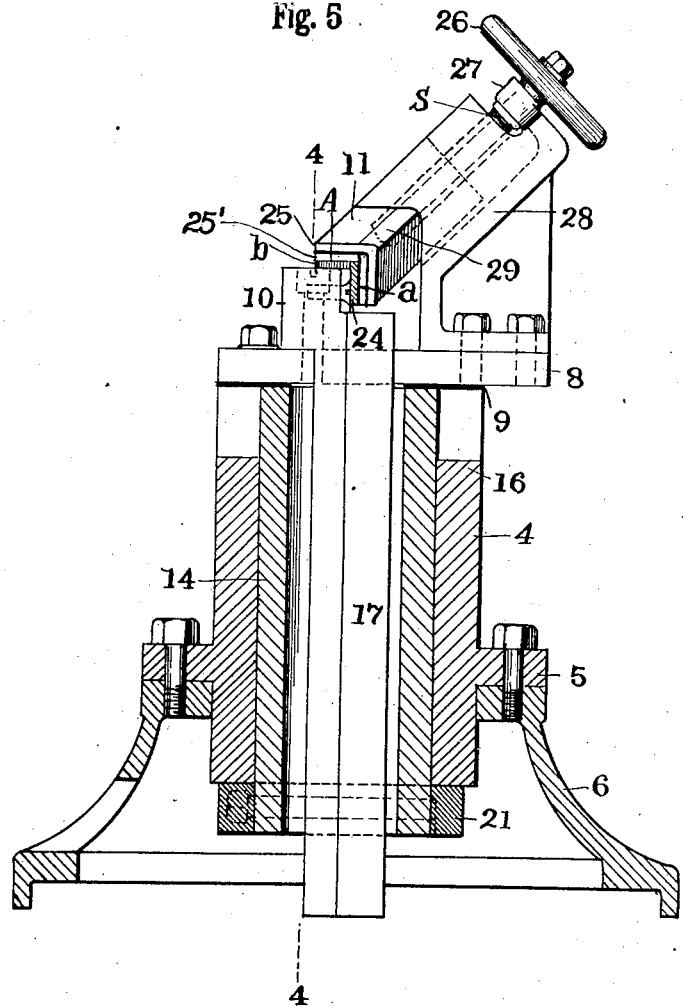
Figure 6:
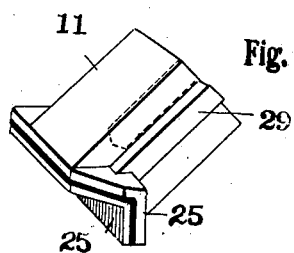
Figure 7:
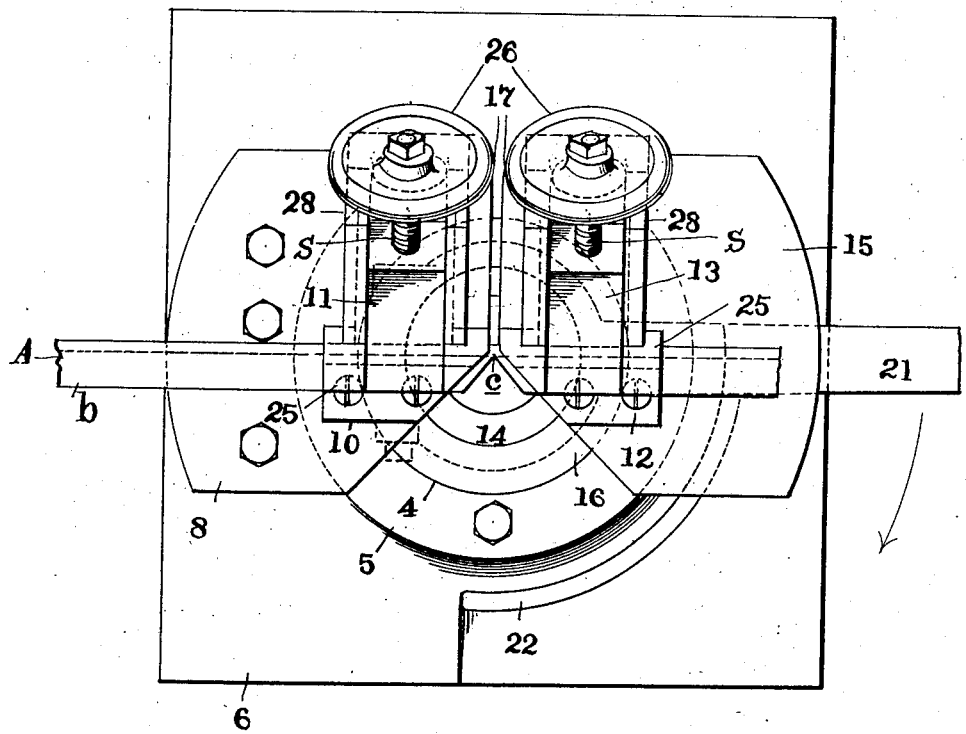
Figure 8:
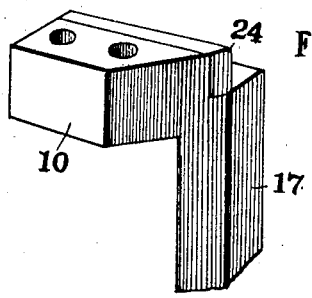

In the accompanying drawings, Figure 1 is a perspective view of the machine, showing a metal bar clamped therein ready for bending and welding. Fig. 2 is a side elevation of a bar notched as it comes to the machine to produce a right-angled bend, and the dotted cross lines x—x indicate the final angle of bend and the amount of stock left uncut to effect a welded union. Fig. 3 is a view of a bent bar, the full lines indicating the first contacting position of the coincident cut portions of the bar, and the dotted lines showing the completed or fixed angle of bend in the bar. Fig. 4 is a vertical section of the machine on line 4—4, Fig. 5, looking to the rear, showing a bar clamped therein ready for bending and welding, and Fig. 5 is a vertical section centrally through the machine on line 5—5, Fig. 4. Fig. 6 is a perspective view of one of the upper clamping members. Fig. 7 is a plan view of the machine. Fig. 8 is a perspective view of one of the lower clamping members, but with its depending leg broken short.

The machine is particularly constructed to bend and weld bars of angle iron, but is not necessarily limited in use to this form and shape of bar. However, the present showing illustrates the machine as adapted to an angle-bar A of L shape in cross section having two flanges $a$ and $b$ at right angles. In order to bend bar A to any predetermined angle, a necessary first step is to notch or cut one of the flanges, otherwise buckling of the bar would result. The notch or cut $c$ is preferably of triangular formation, but the amount of stock removed is dependent upon the degree of angle to which the bar is to be bent; and in any case, a certain amount of surplus stock is left at one or both the diverging edges of the cut so that a welded union may be obtained. For example, assuming that a welded right-angled bend is to be made, flange $b$ of bar A is cut or notched as shown in Figs. 2 and 3, leaving about the amount of stock $d$ along each cut edge as shown within the dotted lines $x$—$x$, these dotted lines also representing the final angle of bend. Then having the bar cut in this way, it is brought to the machine and clamped in place—and briefly outlining further operations—the electric current is turned on to heat the metal in the uncut flange $a$ opposite the notch $c$, whereupon the bar is bent until the coincident cut edges come into contact, a position of parts shown in full lines in Fig. 3. The electric current then passes through flange $b$ at the contacting edges and brings this area of the bar to a welding heat and at the same time pressure is applied by carrying bending operations to final completion, thereby upsetting the surplus stock $d$ and effecting a welded union. The whole operation of bending and welding consumes less than a minute in a bar of angle iron having flanges of approximately one and one-fourth inches in width.

Having in mind the foregoing objects, a clear understanding will be had of the machine which comprises a hollow base 2 wherein the electric current transformer 3 may be stored directly beneath the center of a tubular hub 4 having a flange 5 bolted to cap 6 on base 2. Hub 4 has a lateral extension or top shelf 7 upon which a plate 8 is bolted, and this plate rests on insulation 9 as shown in Fig. 4 to electrically insulate the fixed metal clamps 10 and 11 from the body of the machine. Clamps 10 and 11 are to the left of the axial center of the machine, and a similar pair of clamps 12 and 13 are located at an equal distance to the right of this center, but the support for the latter is a separate rotatable member 14 of tubular form sleeved within hub 4 and having an overhanging shelf or table 15 resting upon the segmentally-shaped offset or shoulder 16 of hub 4. The shelf portions of both hub 4 and rotatable member 14 are of corresponding shape, viewed in plan, including plate 8, and said parts are cut away at their front on diverging lines beginning approximately at the axial center of hub 4 to permit rotation of table 15 and its clamps 12 and 13 relatively to fixed plate 8 and clamps 10 and 11 mounted thereon. It will also be observed that bar A is placed within the said clamps with its notch $c$ centrally of the machine, the uncut flange $a$ opposite the notch being approximately on the exact axial center of hub 14. Bending of bar A may therefore proceed at this central point without undue strain on the metal, and to further facilitate operations the flange $a$ is heated preliminary to bending by passing an electric current through the same from clamp to clamp. For this purpose, bottom clamps 10 and 12 have separate depending legs 17 and 18, respectively, which extend through the tubular member 14 into hollow base 2 and serve as terminal posts for the flexible connections 19 and 20 leading to transformer 3.

Legs 17 and 18 are rigid and spaced apart their full length and both are also removed from the walls of member 14, and leg 18 has a rotative movement about leg 17 when member 14 is turned, an operation obtained by hand lever 21 fastened to the bottom end of member 14 and extended through side slot 22 in cap 6. Clamps 10 and 12 are separate blocks of copper fastened to their respective supports by screws 23, and their opposed faces are partly beveled to correspond with the angular outline of plate 8 and shelf 15. A facing plate 24 of steel or other material of poor electrical conductivity is preferably secured to the rear vertical face of clamps 10 and 12 to engage with flange $a$ of bar A, and the advantage of this arrangement is to localize electrical heating of the flange $b$ at the cut edges when the bar is bent and the said edges come into contact. Obviously, when the electric current is passing through the straight bar A heating of flange $a$ is the first result in view of notch $c$ in flange $b$, but when the bar is bent to bring the coincident cut edges together the current will naturally take the most direct path through flange $b$, particularly in view of facing plate 24.

Upper clamps 11 and 13 are substantially alike in construction and mounting, and like reference characters will be applied to like parts. Thus, each upper clamp consists of a block of cast iron substantially square in cross section in its main body, and having an angular head 25 adapted to engage both flanges $a$ and $b$ of bar A when clamped thereupon by screw S which is entered into the upper end of the clamp body. Screw S has a hand wheel 26 and is rotatably supported in hub 27 of a bracket 28 bolted to plate 8 or shelf 15 as the case may be, and each clamp 11 or 13 is provided with longitudinal side ribs 29 adapted to slide in inclined guideways in bracket 28. The inclination of the said upper clamps is preferably fixed at approximately forty-five degrees to a horizontal plane, thereby permitting bar A to be placed within or removed from the clamps with the greatest convenience. The clamping pressure is also applied equally to both flanges of the bar by the inclined arrangement of the upper clamps as shown.

The construction of the clamps may be varied to suit the needs of any particular form of bar, as it will be understood that I, U, T or other shaped bars may be bent and welded in this machine in the same manner as L bars.

The electric current-controlling switch 30 may be mounted on the hand lever 21 as shown in Fig. 1, or may be located on the side of the machine, and any suitable form of switch may be used.

Upper clamps 11 and 13 are provided with steel face-plates 25' insulated from the angular body portion thereof, and these face-plates co-act with face-plate 24 to localize the electric current in the cut flange $b$. Obviously, less heating is required for bending as compared with welding.

What we claim is:

1. In a machine for bending and welding notched angle-iron, a set of electrically isolated clamping devices having separate face plates insulated therefrom to hold a straight piece of angle-iron with its notched portion at an intermediate point between said devices, and a rotatable support for one of said clamping devices having its rotatable axis at an intermediate point between said devices.

2. A bending machine for bars comprising a set of clamping devices for the bar having electrical terminal connections, said devices being separated one from another to pass the electric current through the bar when clamped therein, and means to impart an arc movement to one of said devices in the same plane as the other device and in the same longitudinal plane as the bar.

3. In a machine for bending and welding partially-divided bars, a fixed table having clamping devices secured thereon, a rotatable table having clamping devices mounted thereon in the same plane as said first member, and said clamping devices being separated and having independent electrical terminal connections.

4. In a machine for bending and electrically welding notched bars, separate sets of clamping devices mounted in the same plane and rotatably related and having metal face-plates insulated from the body thereof adapting the bar to be electrically welded along the lines of the notch therein.

5. In a machine for bending and welding partially-divided bars, separate sets of rotatably-related clamps mounted in the same plane and provided with electrical connections, each set of clamps comprising a seating member for the bar and a fastening member movably supported on an inclined plane.

6. In a machine for bending and welding notched bars, a clamp having a fixed support and a second clamp having a tubular support rotatably mounted in said fixed support and electrical connections for said clamps extending through said tubular support.

7. In a machine for bending and welding metal bars, an open support having a clamping member mounted thereon, and an open rotatable support having a clamping member mounted thereon opposite said first clamping member, both said members having rigid leg portions extending through said supports to make electrical terminal connections.

8. In a machine for bending and welding metal bars, a base having separate clamp supporting members mounted thereon in sleeved rotatable relation, separate clamping devices for the bar mounted on each of said members, and electrical terminal conductors for the clamping devices extending through said members, in combination with an electrical device mounted within said base and electrically connected with said conductors.

9. In a machine for bending and welding notched bars, a base having a tubular hub and current conducting clamps for the bar mounted thereon, and a tubular member rotatably sleeved within said hub having current-conducting clamps mounted thereon opposite said other clamps, means to electrically insulate the clamps on the base from the said clamps on the tubular member and a hand lever secured to said rotatable member.

10. In a machine for bending and welding a notched flange in an angle-bar, a set of current-conducting members adapted to clamp the bar at either side of the notch therein, and means interposed between said members and the unnotched flange to localize the welding current at the notched portion during bending operations, and means to rotate said clamping members relatively to one another.

11. In a machine for bending and welding a notched angle-bar, a set of current-conducting clamps having separate clamping face-portions at substantially right angles and of different electrical conductivity.

12. In a machine for bending and welding a notched angle-bar, a current-conducting member having clamping faces at substantially right angles and a beveled end face.

13. In a machine for bending and welding a notched angle-bar, a current-conducting member having a facing-plate of different material at one side thereof to localize heating of a bar at its notched portion during bending operations.

14. In a machine for bending and welding a notched angle-bar, a current-conducting member comprising a head having angularly-related seating faces for the bar and provided with an offset depending leg and terminal connection.

15. In a machine for bending and welding angle-bars, a clamping member having angularly-related seating surfaces, in combination with a second clamping member movably mounted on an inclined plane relatively to said first clamping member.

16. In a machine for bending and welding an angle-bar, a current-conducting member to seat the bar, a clamping member having angularly-related faces to clamp the bar upon said current-conducting member, and means to support said clamping member for inclined movement in respect to the bar.

17. In a machine for bending and welding a notched bar, a hollow base adapted to hold a transformer and a tubular hub mounted centrally thereon having a tubular member rotatably seated therein, lateral extensions on said hub and member, a plate seated in insulated relation on one of said parts, and separate current-conducting and clamping members secured to said plate and the other part.

18. In a machine for bending and welding a partially-divided bar, current-conducting and clamping devices for the bar separated and insulated from one another, means to separately support one of said devices for turning movement about a fixed axis, and said clamping devices having seating surfaces for the bar radially arranged in respect to said axis.

19. In a machine to bend and weld angle iron, a base having a cap provided with a cylindrical hub, and lateral shelves at the top of said hub, one of which is rotatably mounted on the said hub, in combination with separate sets of clamping devices mounted on said shelves, and electric-current conductors for said devices extending through said hub.

20. In a machine to bend and weld angle-bars, a cap having a side opening and provided with a hub, a rotatable member sleeved within said hub having a hand lever projecting through said side opening, and separate sets of current-conducting clamps for the bar mounted upon the hub and said rotatable member.

21. In a machine to bend and weld angle-bars, separate sets of current-conducting clamps, each comprising a fixed member and a movable member supported to slide on an inclined plane, in combination with a divided support for said separate sets of clamps rotatably arranged to swing one set of clamps on an arc about the other set of clamps and on the same plane therewith.

22. A machine adapted to bend and weld a bar of angle-iron having one of its flanges partially sub-divided at the point of bend, comprising separate devices rotatably related side by side in the same plane to clamp both the integral and the divided flanges of the bar on opposite sides, said devices being provided with means to pass an electric heating current through the integral length of the bar before bending and through the sub-divided flange during bending operations.

23. In a machine of the kind described, separate sets of electric current-conducting clamps having beveled ends oppositely related to permit a rotatable movement adapting said ends to come into substantially parallel alinement, and the clamps of one set being electrically insulated from the clamps of the other set, separate supports for said clamps at either side of a rotatable axis, and means to rotate one of said supports about said axis.

In testimony whereof we affix our signatures in presence of two witnesses.

WILLIAM C. WINFIELD.
ALBERTIS C. TAYLOR.

Witnesses:
J. L. Herzog,
Grace B. Vogel.